United States Patent
Contreras (10) Patent No.: US 10,757,115 B2
(45) Date of Patent: Aug. 25, 2020

(54) DETECTING SAFE INTERNET RESOURCES

(71) Applicant: Chronicle LLC, Mountain View, CA (US)

(72) Inventor: Emiliano Martinez Contreras, Marbella (ES)

(73) Assignee: Chronicle LLC, Mountain View, CA (US)

( * ) Notice: Subject to any disclaimer, the term of this patent is extended or adjusted under 35 U.S.C. 154(b) by 250 days.

(21) Appl. No.: 16/023,975

(22) Filed: Jun. 29, 2018

(65) Prior Publication Data

US 2019/0014130 A1 Jan. 10, 2019

(30) Foreign Application Priority Data

Jul. 4, 2017 (EP) .................................... 17382432

(51) Int. Cl.
*H04L 29/06* (2006.01)
*H04L 29/08* (2006.01)
*G06F 21/56* (2013.01)

(52) U.S. Cl.
CPC ........ *H04L 63/1408* (2013.01); *G06F 21/565* (2013.01); *H04L 63/145* (2013.01); *H04L 67/02* (2013.01); *H04L 67/06* (2013.01); *H04L 67/2833* (2013.01)

(58) Field of Classification Search
None
See application file for complete search history.

(56) References Cited

U.S. PATENT DOCUMENTS

| | | | |
|---|---|---|---|
| 9,129,116 B1 * | 9/2015 | Wiltzius | G06F 21/577 |
| 9,270,467 B1 * | 2/2016 | Chen | H04L 9/3236 |
| 10,262,136 B1 * | 4/2019 | Kailash | G06F 21/56 |
| 2004/0268451 A1 * | 12/2004 | Robbin | G06Q 20/10 |
| | | | 715/738 |
| 2006/0218637 A1 * | 9/2006 | Thomas | G06F 21/51 |
| | | | 726/23 |
| 2012/0011588 A1 * | 1/2012 | Milener | H04L 63/1425 |
| | | | 726/24 |
| 2012/0297469 A1 * | 11/2012 | Reeder | H04L 9/3297 |
| | | | 726/7 |
| 2016/0012213 A1 * | 1/2016 | Walsh | G06F 21/16 |
| | | | 726/27 |
| 2017/0026393 A1 * | 1/2017 | Walsh | H04L 61/00 |

OTHER PUBLICATIONS

'www.virustotal.com' [online] "Virus Total," Available on or before Jun. 2004 via the wayback internet archive [retrieved on Nov. 27, 2018] Retrieved from Internet: URL<https://www.virustotal.com/#/home/upload> 1 page.

* cited by examiner

*Primary Examiner* — Shin-Hon (Eric) Chen
(74) *Attorney, Agent, or Firm* — Fish & Richardson P.C.

(57) ABSTRACT

In some implementations, a method includes receiving, by a malware detection system, a request for a certification user interface element for a file to be served in an Internet resource, wherein the file is a file that has previously been classified as not containing malware by the malware detection system, and wherein the certification user interface element certifies that the file has been classified by the malware detection system as not containing malware, determining, based on the request, that the file is available for download from an Internet resource, and storing data that identifies the Internet resource as a location where a malware-free file is available for download.

16 Claims, 4 Drawing Sheets

DETECTING SAFE INTERNET RESOURCES

CROSS-REFERENCE TO RELATED APPLICATION

This application claims priority under 35 U.S.C. § 119 to European Patent Application No. 17382432.7, filed on Jul. 4, 2017. The contents of this application is hereby incorporated by reference in its entirety.

BACKGROUND

This specification generally relates to downloading files from remote Internet resources. The files are determined to be safe—free of malware—for download using antivirus software programs. Antivirus software programs scan files to detect malware using various detection techniques and algorithms.

SUMMARY

Malware often disrupts computer operations and gathers private or sensitive information of users or organizations without permission. In some instances, users attempt to download files from Internet resources that host the files, and there is a risk that the files contain malware. To prevent any security breaches, a user may limit his download activity to accessing only files that are known to be safe.

Internet sources can provide certain indicators to users that particular hosted web pages or files are safe files that do not contain malware. In general, these indicators are presented with the safe web pages or files, and are issued by a trusted organization, such as a malware detection system. The indicators can include visual elements such as seal or hidden elements such as a trust certificate, and provide users with a simple tool to determine whether a resource is safe to access.

Malware detection systems can scan resources such as web pages or files using antivirus software programs to generate an antivirus verdict indicating whether the scanned resource contains malware. Antivirus verdicts for a particular resource from multiple antivirus programs can be associated with the particular resource and stored. The next time that a user requests a particular resource for which a data entry exists indicating at least one antivirus verdict from an Internet source, a malware detection system can access the stored entry to determine whether the resource has previously been classified as containing or not containing malware.

The malware detection system generates code that causes a certification indicator to be requested for presentation on the Internet resource that hosts a file available for download and provides the code to an entity that maintains the Internet resource. The entity adds the code to the Internet resource, and when the file is requested for download from the Internet resource, the certification indicator is requested for presentation on the Internet resource. The presence of the certification indicator suggests to a user that the particular resource available for download is safe.

In one general implementation, a malware detection system parses a request for a certification user interface element for a particular file that certifies that the particular file has been classified as not containing malware. The particular file is hosted on an Internet resource, and has previously been classified as not containing malware. For example, the malware detection system may have previously scanned the particular file with one or more antivirus software programs and classified the particular file as not containing malware based on the antivirus verdicts generated by the antivirus software programs. The malware detection system determines whether the particular file identified in the request for the certification user interface element is available for download from the Internet resource. If the requested resource is available for download from the Internet resource, the malware detection system stores data that identifies the Internet resource as a location from which a safe file can be downloaded.

In general, one innovative aspect of the subject matter described in this specification can be embodied in a method that includes receiving, by a malware detection system, a request for a certification user interface element for a file to be served in an Internet resource, wherein the file is a file that has previously been classified as not containing malware by the malware detection system, and wherein the certification user interface element certifies that the file has been classified by the malware detection system as not containing malware, determining, based on the request, that the file is available for download from an Internet resource, and storing data that identifies the Internet resource as a location where a malware-free file is available for download.

Implementations may include one or more of the following features. For example, the method can include determining, using the stored data, whether other files that are available at the Internet resource or at a same web site as the Internet resource contain malware. In some implementations, the determining that the file is available for download from the Internet resource includes identifying, by the malware detection system, a file that is available for download from the Internet resource. The method can include hashing, by the malware detection system, the identified file to a first hash, and determining, by the malware detection system, that the first hash is the same as a hash of the file.

In some implementations, the method includes obtaining, by the malware detection system, the file for analysis, determining that the file does not contain malware, and in response to determining that the file does not contain malware: classifying the file as a malware-free file that does not contain malware, and providing a code snippet that, when included in an Internet resource, causes the certification user interface element to be requested from the malware detection system. In some implementations, the method includes accessing, by the malware detection system, a known resources database, and determining, based on a stored entry in the known resources database corresponding to the file, that the file does not contain malware.

The method can include generating, by the malware detection system and based on the stored entry in the known resources database corresponding to the file, the code snippet. In some implementations, determining that the file does not contain malware determining, by the malware detection system, that the file does not correspond to any stored entries in a known resources database, in response to the determining, scanning, by the malware detection system and using one or more antivirus software programs, the particular file, and determining, based on the scanning, that the file does not contain malware.

In some implementations, classifying the file as a malware-free file that does not contain malware comprising storing, by the malware detection system and in the known resources database, an entry identifying the file and including an indicator that the file does not contain malware. The method can include storing, in a database, data indicating the location of the Internet resource and including an indicator that the file is a malware-free, accessing, by the malware detection system, the database, identifying, by the malware detection system and based on stored data in the database, a set of entries in the database corresponding to the location of the Internet resource, and determining, by the malware detection system and based on the set of entries in the database, that the location of the Internet resource is a trusted location.

Another innovative aspect of the subject matter described in this specification can be embodied in a malware detection system that includes one or more computers and one or more storage devices storing instructions that when executed by the one or more computers cause the one or more computers to perform operations. These operations can include receiving, by the malware detection system, a request for a certification user interface element for a file to be served in an Internet resource, wherein the file is a file that has previously been classified as not containing malware by the malware detection system, and wherein the certification user interface element certifies that the file has been classified by the malware detection system as not containing malware, determining, based on the request, that the file is available for download from an Internet resource, and storing data that identifies the Internet resource as a location where a malware-free file is available for download.

In some implementations, the operations can include determining, using the stored data, whether other files that are available at the Internet resource or at a same web site as the Internet resource contain malware. In some implementations, the determining that the file is available for download from the Internet resource includes identifying, by the malware detection system, a file that is available for download from the Internet resource. The operations can include hashing, by the malware detection system, the identified file to a first hash, and determining, by the malware detection system, that the first hash is the same as a hash of the file.

In some implementations, the operations can include obtaining, by the malware detection system, the file for analysis, determining that the file does not contain malware, and in response to determining that the file does not contain malware: classifying the file as a malware-free file that does not contain malware, and providing a code snippet that, when included in an Internet resource, causes the certification user interface element to be requested from the malware detection system. In some implementations, the operations can include accessing, by the malware detection system, a known resources database, and determining, based on a stored entry in the known resources database corresponding to the file, that the file does not contain malware.

The operations can include generating, by the malware detection system and based on the stored entry in the known resources database corresponding to the file, the code snippet. In some implementations, determining that the file does not contain malware determining, by the malware detection system, that the file does not correspond to any stored entries in a known resources database, in response to the determining, scanning, by the malware detection system and using one or more antivirus software programs, the particular file, and determining, based on the scanning, that the file does not contain malware.

In some implementations, classifying the file as a malware-free file that does not contain malware comprising storing, by the malware detection system and in the known resources database, an entry identifying the file and including an indicator that the file does not contain malware.

Another innovative aspect of the subject matter described in this specification can be embodied in one or more non-transitory computer readable media storing instructions that when executed by one or more computers cause the one or more computers to perform operations. These operations include receiving, by a malware detection system, a request for a certification user interface element for a file to be served in an Internet resource, wherein the file is a file that has previously been classified as not containing malware by the malware detection system, and wherein the certification user interface element certifies that the file has been classified by the malware detection system as not containing malware, determining, based on the request, that the file is available for download from an Internet resource, and storing data that identifies the Internet resource as a location where a malware-free file is available for download.

In some implementations, the operations can include obtaining, by the malware detection system, the file for analysis, determining that the file does not contain malware, and in response to determining that the file does not contain malware: classifying the file as a malware-free file that does not contain malware, and providing a code snippet that, when included in an Internet resource, causes the certification user interface element to be requested from the malware detection system.

The subject matter described in this specification can be implemented in particular embodiments so as to realize one or more of the following advantages. The proposed system reduces the amount of computing resources needed to determine which resources or web sites have safe files available for download by accessing previously stored data on whether files provided for download at the resource are safe. The stored data can be generated by having previously scanned the files using one or more antivirus software programs and storing antivirus verdicts provided by the antivirus software.

The system automatically makes determinations as to whether each file requested for download is safe. The system accurately classifies files as safe without having explicitly scanned the file with antivirus software programs by extrapolating, based on other files available for download on the resource or web site, whether files requested for download by a user from the resource or web site are safe without needing to scan each of the files on the resource.

Additionally, by obtaining and analyzing files requested by users and extrapolating the security status of other files available at the same Internet resource or a same website as the Internet resource, the system allows antivirus researchers to build a whitelist from a small number of files. A user interface element provides a simple tool for users to determine whether a file is safe for download, and reduces the amount of computer resources used to remove malware from a computer by preventing the download of files containing malware. The certification element deters providers of malware by making it obvious as to whether a particular Internet resource contains malware.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for certifying whether a file is safe for download.

A malware detection system can determine whether a file is safe for download. In some examples, the malware detection system scans the file with one or more antivirus software programs and uses the antivirus verdicts generated by the antivirus software programs to determine whether the file is safe for a user to download. If the malware detection system determines that the file is safe, the malware detection system can generate a code snippet that causes an Internet resource to request a certification user interface element for presentation on the Internet resource that indicates to users that the file is safe. The malware detection system can then provide the code snippet to an entity that requested the file to be scanned for inclusion in a web page that has the file available for download.

Figure 1:
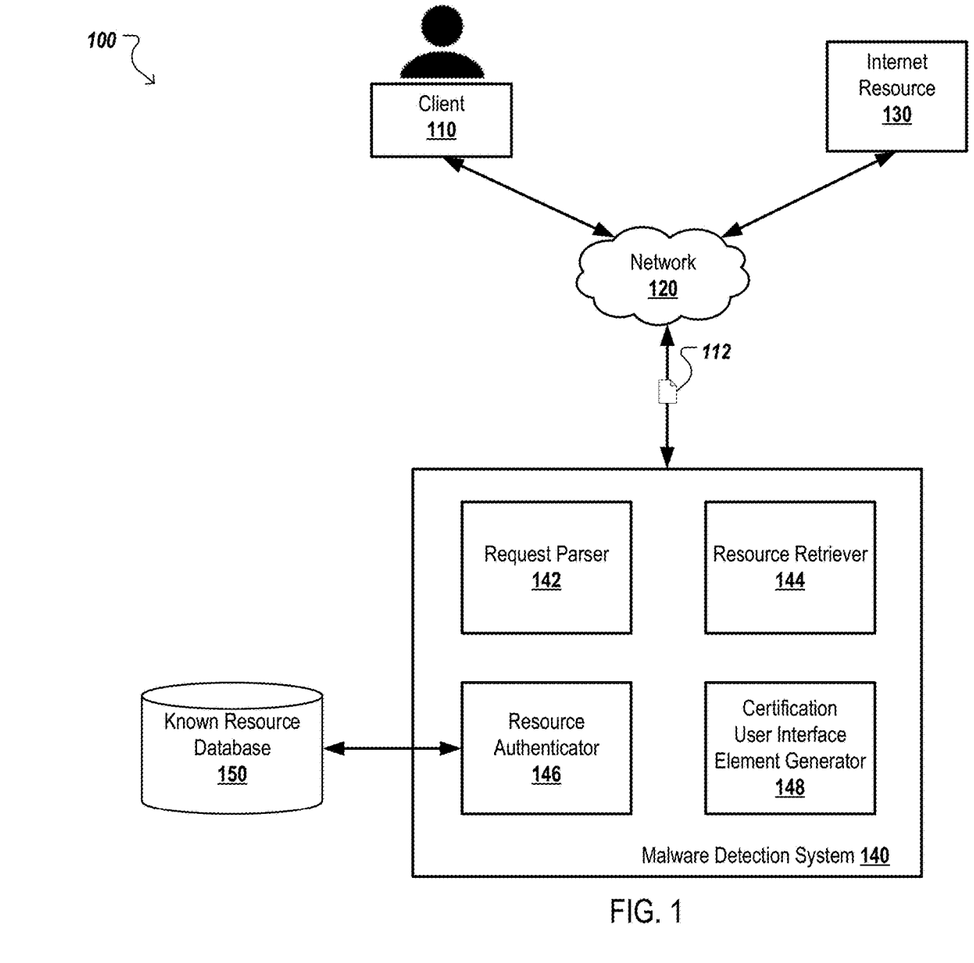
FIG. 1 is a system diagram that illustrates an example malware detection system that determines whether a particular file is safe for download by a user.

FIG. 1 is a system diagram that illustrates an example malware detection system 100 that informs users of whether a file requested for download is safe. The system 100 includes a client 110 communicably connected to a network 120. The client device 110 is able to access an Internet resource 130 through the network 120, and a user of the client device 110 may request files, such as file 112, for download from the Internet resource 130. The client device 110 and the Internet resource 130 are connected to a malware detection system 140 through the network 120, and can each request and receive data and instructions from the malware detection system 140.

The client device 110 may be an electronic device that is capable of requesting and receiving resources over the network 120. Example client devices 110 include personal computers, mobile communication devices, and other devices that can send and receive data over the network 120. A client device 110 typically includes a user application, such as a web browser, to facilitate the sending and receiving of data over the network 120, but native applications executed by the client device 110 can also facilitate the sending and receiving of data over the network 120.

The file 112 is an electronic resource that stores information, and can include a variety of content. The file 112 has a format defined by its content. The format of the file 112 may be indicated, for example, by a filename extension. The file 112 may include metadata, or data that provides information about the contents and/or attributes of the file 112. The file 112 can include, for example, static content (e.g., text or other specified content) that is within the file itself and/or does not change over time. The file 112 can also include dynamic content that may change over time or on a per-request basis. For example, a user can maintain a data source that is used to populate portions of a separate electronic document. In this example, the given file can include one or more tags or scripts that cause the client device 110 to request content from the data source when the given file is processed (e.g., rendered or executed) by the client device 110. The client device 110 integrates the content obtained from the data source into the given electronic document, such as a web page, to create a composite electronic document including the content obtained from the data source. The file 112 can be any of various types of files, including multimedia audio and/or video, batch files, executable files, image files, text files, compressed files, class files, database files, or other file formats.

The network 120 can be a local area network (LAN), a wide area network (WAN), the Internet, or a combination thereof. The network 120 connects the client device 110 with the malware detection system 140. The network 120 may include 802.11 "Wi-Fi" wireless Ethernet (e.g., using low-power Wi-Fi chipsets), Bluetooth, networks that operate over AC wiring, or Category 5 (CAT5) or Category 6 (CAT6) wired Ethernet network.

The Internet resource 130 can be any of various resources, such as a web page, an image, a text document, multimedia content, or an executable file. The Internet resource 130 can provide a link to download a file. For example, the Internet resource 130 can be a web page that is part of a website that hosts files available for download and that includes a link for each of the available files that allows a user to download the file. The system 100 can include multiple Internet resources 130, but for simplicity, the following description refers to a single Internet resource 130.

The malware detection system 140 processes files to determine whether the files contain malware. The malware detection system 140 receives files for processing from users of the system 100. The malware detection system 140 classifies the files as containing malware or not containing malware by scanning the files using one or more antivirus software programs, and stores the classifications. The received files can include files hosted by the Internet resource 130, and the malware detection system 140 can determine and store a status of one or more files of the Internet resource 130 has either containing malware or not containing malware.

Additionally, the malware detection system 140 can access the stored classifications to determine whether a received file has already been classified, and what the classification is. Based on the stored or generated classification, the malware detection system 140 can provide a certification user interface element associated with a particular file that indicates the safety of the particular file. The malware detection system 140 includes a request parser 142, a resource retriever 144, a resource authenticator 146, and a certification user interface element generator (CUIEG) 148. The malware detection system 140 may store the received files in a known resource database 150, which is a memory, such as a hard drive, a data store, etc.

A user can request to download a file through a web browser that presents a web page that hosts the file. The web page can include a certification user interface element to be presented with the file, such that when the user's browser attempts to render the web page, the browser will request the certification user interface element. The request can, for example, be an HTTP GET request for a representation of the web page and can include HTTP headers that contain data specifying the location of the web page. The browser can transmit the request to the malware detection system 140 to receive the certification user interface element.

The request parser 142 parses such requests to display a certification user interface element received by the malware detection system 140. The certification user interface element can be a visual, aural, haptic, or other type of sensory indicator of the safety of a requested file. For example, the certification element can be a seal displayed on the Internet resource 130 with the requested file. The certification element can be a particular sound played when a user accesses the Internet resource 130 or a vibration pattern performed by the client device 110. The certification element can be a combination of various types of user interface elements, such as a combination of a visual indicator and a particular sound.

The certification element is associated with a particular file that is available for download from the Internet resource 130. The certification element can be associated more generally with the Internet resource 130 or a particular portion of the Internet resource. For example, the certification element can be associated with a particular section of an Internet blog 130. The certification element provides a user with a simple tool for determining the safety of a particular file available for download from the Internet resource 130.

In some examples, the certification element can include a link to download a particular file that has been classified as a safe file from the malware detection system 140 directly. The malware detection system 140 can store files that have been provided for scanning in a memory, such as the known resource database 150, or in a local memory within the malware detection system 140. The malware detection system 140 can then provide the file requested when a user selects a link to download the file directly from the malware detection system 140, further reducing the possibility of a user downloading a file containing malware.

The resource retriever 144 retrieves resources from the Internet. The resource retriever 144 can access the Internet resource 130 through the network 120 to retrieve a file requested from the Internet resource 130. The file requested is the file associated with the certification element. In some examples, the resource retriever 144 can crawl the Internet to retrieve resources to be classified in the known resource database 150.

The resource authenticator 146 determines whether a requested file is safe for download by a user by determining whether the file contains malware. The resource authenticator 146 can determine whether a requested file contains malware as the file is received by the malware detection system 140 by scanning the file with antivirus software programs. For example, the resource authenticator 146 can scan the file with one or more antivirus software programs that each generate an antivirus verdict that indicates whether the file contains malware.

The resource authenticator 146 can use one or more antivirus verdicts to determine whether the file contains malware by aggregating the verdicts to produce a metric that indicates how many of the antivirus software programs detected that the file did not contain malware. For example, the resource authenticator 146 can output a metric that indicates that 43/50 of the antivirus software programs determined that a particular file does not contain malware. The resource authenticator 146 can use the determined metric to produce an overall verdict. For example, the resource authenticator 146 can determine, based on compare an aggregate metric, 25/45 to a predetermined threshold metric, at least 30/45, that the overall verdict is that the file may contain malware.

The resource authenticator 146 can also determine whether a requested file contains malware by accessing a database of known resources, such as the known resource database 150. The known resource database 150 can store data indicating whether a previously analyzed, or known, file contains malware. For example, the resource database 150 can include antivirus verdicts previously generated by antivirus software programs for a particular known file. For a particular requested file, the resource authenticator 146 can access the previously generated antivirus verdicts to determine whether antivirus verdicts correspond to the particular requested file. The resource authenticator 146 can determine, based on the antivirus verdicts identified as corresponding to the particular requested file, whether the particular requested file contains malware. The resource authenticator 146 can aggregate the identified antivirus verdicts corresponding to the particular requested file to produce an aggregate metric or overall verdict as described above. For example, the resource authenticator 146 can aggregate the identified antivirus verdicts to produce an aggregate metric indicating that 15/24 antivirus software programs determined that the particular requested file does not contain malware. The resource authenticator 146 can compare the aggregate metric, 15/24, to a threshold metric, such as 23/24, and determine that the aggregate metric is lower than the threshold metric to generate an overall verdict that the particular file may contain malware.

If a requested file is not found in the known resource database, the resource retriever 144 can download the requested file from the Internet resource 130 and provide the downloaded file to the resource authenticator 146 to determine whether the file contains malware. In some examples, when the user requests access to the file through the client 110, the malware detection system 140 can direct the client 110 to a source other than the Internet resource 130 and the resource retriever 144 can provide the file to the client device 110 through the network 120.

The threshold metric can be predefined based on various factors, including a number of antivirus verdicts available for the particular file, types of antivirus software programs used to determine the antivirus verdicts, the particular antivirus software programs used to determine the antivirus verdicts, or one or more characteristics of the particular file, such as a file type, a file size, or the Internet resource 130 that hosts the particular file. The threshold metric can be selected by a user of the system 100 or can be selected automatically by the malware detection system 140. For example, the malware detection system 140 can determine, based on the requested file being a .exe file and the antivirus software programs that have produced antivirus verdicts for the requested file each having a high confidence level, that the threshold metric can be 12/20 antivirus verdicts indicating that the file does not contain malware.

The CUIEG 148 generates the certification user interface element that certifies that a requested file does not contain malware. The CUIEG 148 determines, based on the output from the resource authenticator 146, what type of certification element to generate. For example, the CUIEG 148 can determine, based on the output of the CUIEG 148, that the certification element can be a seal displaying the overall verdict generated by the CUIEG 148. The certification element can display the aggregated metric, or a different representation of the output of the CUIEG 148. The certification element can be a sound that plays when a user accesses the Internet resource 130 that indicates the output for the CUIEG 148. For example, the certification element can be a sound clip that says "The requested file likely does not contain malware." The type of certification element can be selected based on input from a user of the system 100, such as a user of the client 110. For example, the malware detection system 140 can receive from the request for the code snippet from the Internet resource 130 data indicating information about the client 110 or the user of the client 110, such as whether the user has accessibility preferences.

The CUIEG 148 can generate a code snippet that, when presented by the Internet resource 130, presents the certification element. The CUIEG 148 can provide the code snippet to the Internet resource 130 in response to receiving a request for the code snippet from the Internet resource 130. In some examples, the CUIEG 148 only provides the certification element to the Internet resource 130 when the output generated by the resource authenticator because the presence of a certification element can suggest to users that the requested file is safe, regardless of the verdict indicated by the certification element. In such examples, the CUIEG 148 can determine whether the output indicates that the requested file does not contain malware, and based on the determination, output the certification element. For example, if the overall verdict generated by the resource authenticator 146 indicates that the requested file may contain malware, the CUIEG 148 can determine not to provide a code snippet to the Internet resource 130 that presents the certification element. The CUIEG 148 can provide the code snippet to the Internet resource 130 through the network 120.

Figure 2:
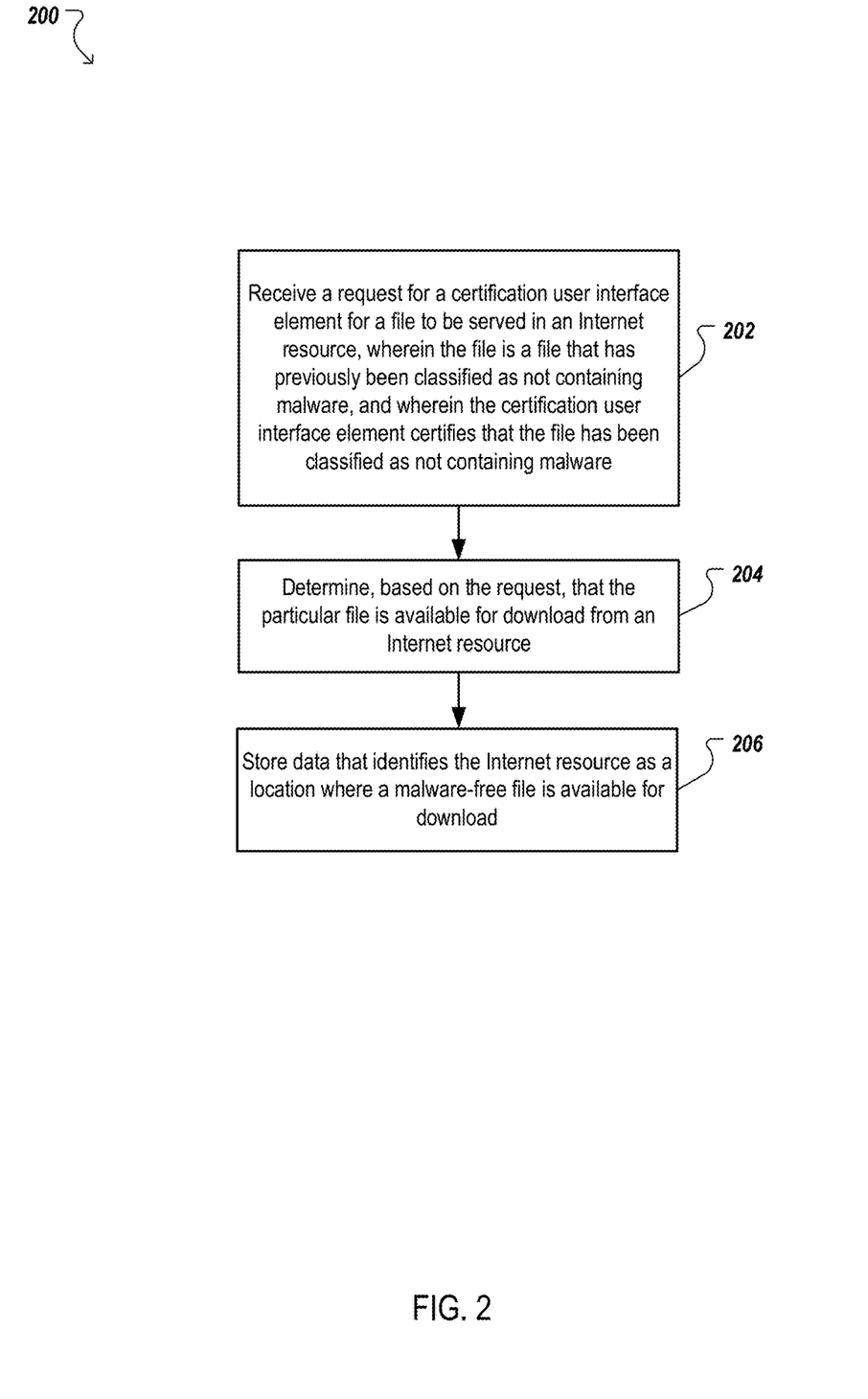
FIG. 2 is a flow diagram that illustrates an example process for requesting a certification user interface element that certifies the safety of a file requested for download.

FIG. 2 is a flowchart of an example process 200 for providing a certification user interface element. The process 200 may be performed by a system of one or more computers in one or more locations such as the malware detection system 140.

The system receives a request for a certification user interface element for a particular file to be served in an Internet resource, wherein the particular file is a file that has previously been classified as not containing malware by the malware detection system, and wherein the certification user interface element certifies that the particular file has been classified by the malware detection system as not containing malware (202). For example, the malware detection system 140 can receive the request for a certification user interface element through the network 120 from the Internet resource 130. The request parser 142 can parse the received request to identify the particular file and its location, as well as the Internet resource 130. The resource authenticator 146 can determine, by accessing the known resource database 150, whether the particular file has previously been classified as not containing malware.

The malware system 140 determines, based on the request, that the particular file is available for download from an Internet resource (204). For example, the resource retriever 144 can access the Internet resource 130 to determine whether the particular file is available for download from the Internet resource 130.

The resource retriever 144 can determine whether the particular file is available for download from the Internet resource 130 by identifying a file that is available for download from the Internet resource 130, for example, by crawling a Uniform Resource Locator (URL) included in the received request to identify while file or files are available for download from the resource 130. The resource retriever 144 can then hash the identified file to a first hash. For example, the resource retriever 144 can use a hash function to generate a hash. Any of various hash function algorithms can be used by the resource retriever 144, including trivial hash function, a perfect hash function, a rolling hash, a universal hash, a hash function with checksum functions, a multiplicative hash function, a cryptographic hash function, a nonlinear table lookup function, etc. As an example, the resource retriever 144 may use MD5 hashes.

The resource retriever 144 can then access the known resource database 150 to identify a hash of the particular file, and determine whether the first hash is the same as a hash of the particular file.

The malware system 140 stores data that identifies the Internet resource as a location where a file that does not contain malware is available for download (206). For example, the resource authenticator 146 can store, in the known resource database 150, data that identifies the Internet resource 130 as a location where a file that does not contain malware is available for download. The presence of a safe file available for download from a particular Internet resource, such as the Internet resource 130, can be used as a factor in determining whether other files available for download from the Internet resource 130 are safe.

The resource authenticator 146 can access the known resource database 150 and use stored data to determine whether other files that are available at the Internet resource 130 or at a same web site as the Internet resource 130 contain malware. The resource authenticator 146 can access data stored in the known resource database 150 that identifies a particular Internet resource as a location where a file that does not contain malware is available for download, and can determine, based on the accessed data, that another file available for download from the particular Internet resource also does not contain malware. For example, the resource authenticator 146 can predict, based on a calculated metric of a proportion of files available at the Internet resource 130 or at a same web site as the Internet resource 130 that were classified as not containing malware, whether other files available at the Internet resource 130 or at a same web site as the Internet resource 130 contain malware. If, in such an example, the calculated metric indicated that a proportion of files were classified as not containing malware was higher than or at least a threshold proportion of files, the resource authenticator 146 can determine that other files available at the Internet resource 130 or at a same web site as the Internet resource 130 are likely to not contain malware.

The malware system 140 can determine, using the stored data that identifies the Internet resource as a location where a file that does not contain malware is available for download, whether other files that are available at the Internet resource or at a same web site as the Internet resource contain malware. For example, the malware system 140 can predict that, because all known files from a web domain that includes the Internet resource are classified as not containing malware, an unknown file newly available for download from the web domain likely does not contain malware.

Figure 3:
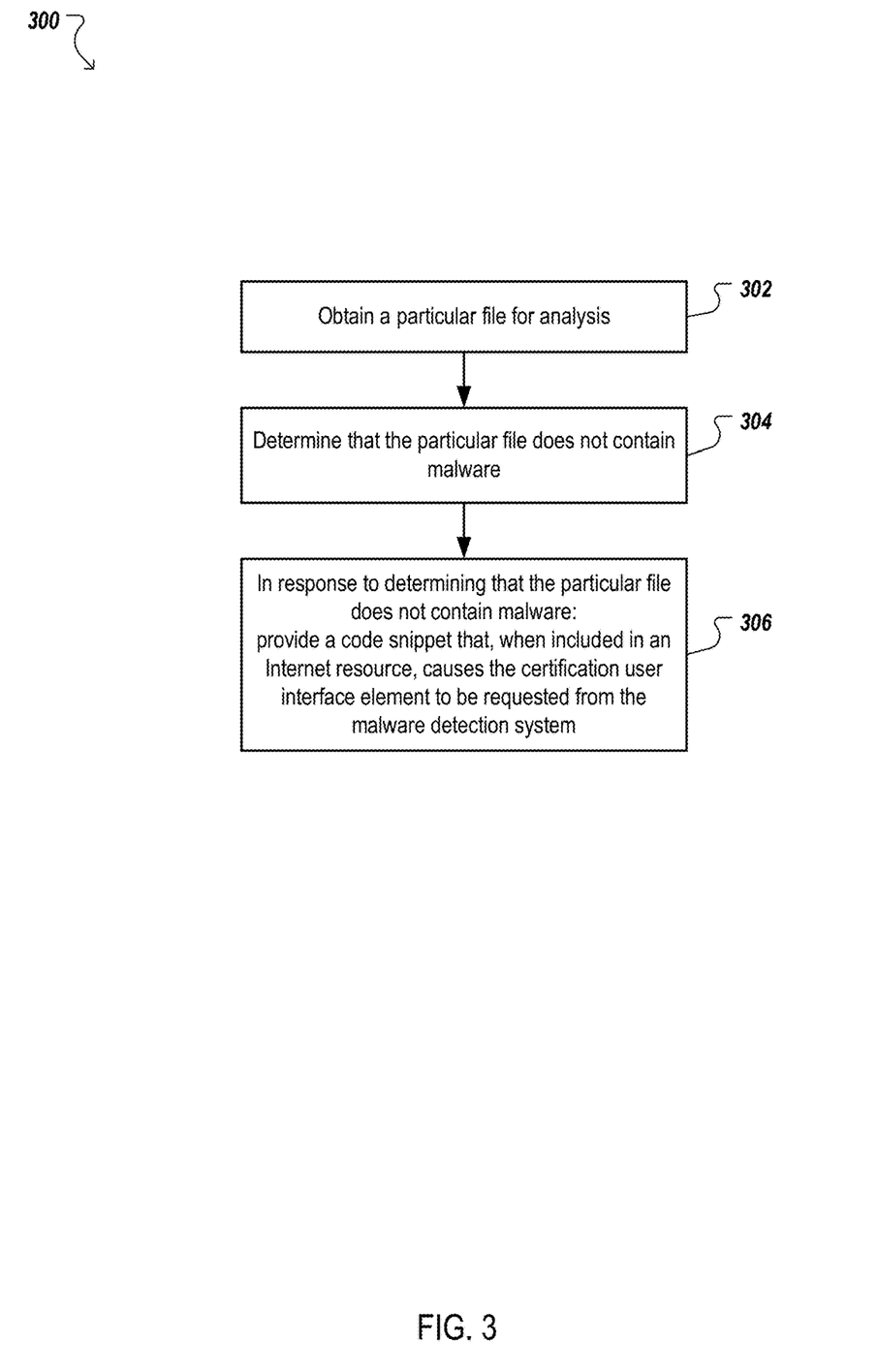
FIG. 3 is a flow diagram that illustrates an example process for providing an Internet source with a code snippet that causes presentation of a certification user interface element.

FIG. 3 is a flowchart of an example process 300 for providing a certification user interface element as described with respect to FIGS. 1-2. The process 300 may be performed by a system of one or more computers in one or more locations such as the malware detection system 140.

The malware detection system obtains the particular file for analysis (302). For example, the resource retriever 144 can obtain the particular file from the Internet resource through the network 120.

The malware detection system 140 determines that the particular file does not contain malware (304). For example, the resource authenticator 146 can determine that the particular file does not contain malware either by scanning the file as it is received by the malware detection system 140 or accessing stored data in the known resource database 150, as described with respect to FIGS. 1-2. The resource authenticator can then store data in the known resource database 150 that classifies the particular file as not containing malware.

In response to determining that the particular file does not contain malware, the malware detection system 140 then provides a code snippet that, when included in an Internet resource, causes the certification user interface element to be requested from the malware detection system 140 (306). For example, the CUIEG 148 can provide a code snippet to the Internet resource 130 or to a host or manager of the Internet resource 130 that presents a certification user interface element that indicates whether the file contains malware, as described above with respect to FIGS. 1-2.

In some examples, the process 300 occurs prior to the process 200, and the particular file is provided for analysis by an entity that maintains the Internet resource 130. For example, a web site that provides free educational materials may wish to assure visitors to the website that the available materials are safe for download. An administrator of the website may provide each of the files to the malware detection system 140 for classification. Once each file has been classified as not containing malware, the administrator can include the code snippet with the code for each particular page that presents a file available for download. Each page that includes the code snippet can then automatically trigger the process 200 when a user visits the page to download a file, by causing the user's browser to request the certification user interface element.

The resource authenticator 146 can access a known resources database, such as the known resources database 150 and determine, based on a stored entry corresponding to the particular file in the known resources database 150, that the particular file does not contain malware.

In some examples, the code snippet is generated by a component of the malware detection system 140, such as the CUIEG 148, using a stored entry in the known resources database corresponding to the particular file as described above with respect to FIGS. 1-2.

In some cases, the malware detection system 140 can determine that the particular file does not correspond to any stored entries in the known resources database 150. The resource authenticator 146 can then scan, using one or more antivirus software programs, the particular file. The resource authenticator 146 can determine, based on the scanning, that the particular file does not contain malware. Then the resource authenticator 146 can classify that the file doesn't contain malware by storing an entry indicating that the particular file does not contain malware in the known resource database 150.

In some examples, after the CUIEG 148 generates the code snippet, the resource authenticator 146 stores data in a database that indicating that the particular file does not contain malware. The resource authenticator 146 can access the database and identify, based on the stored data in the database, a set of entries in the database corresponding to the location of the particular resource. The malware detection system 140 can determine, based on the set of entries in the database, that the location of the particular resource is a trusted location.

Figure 4:
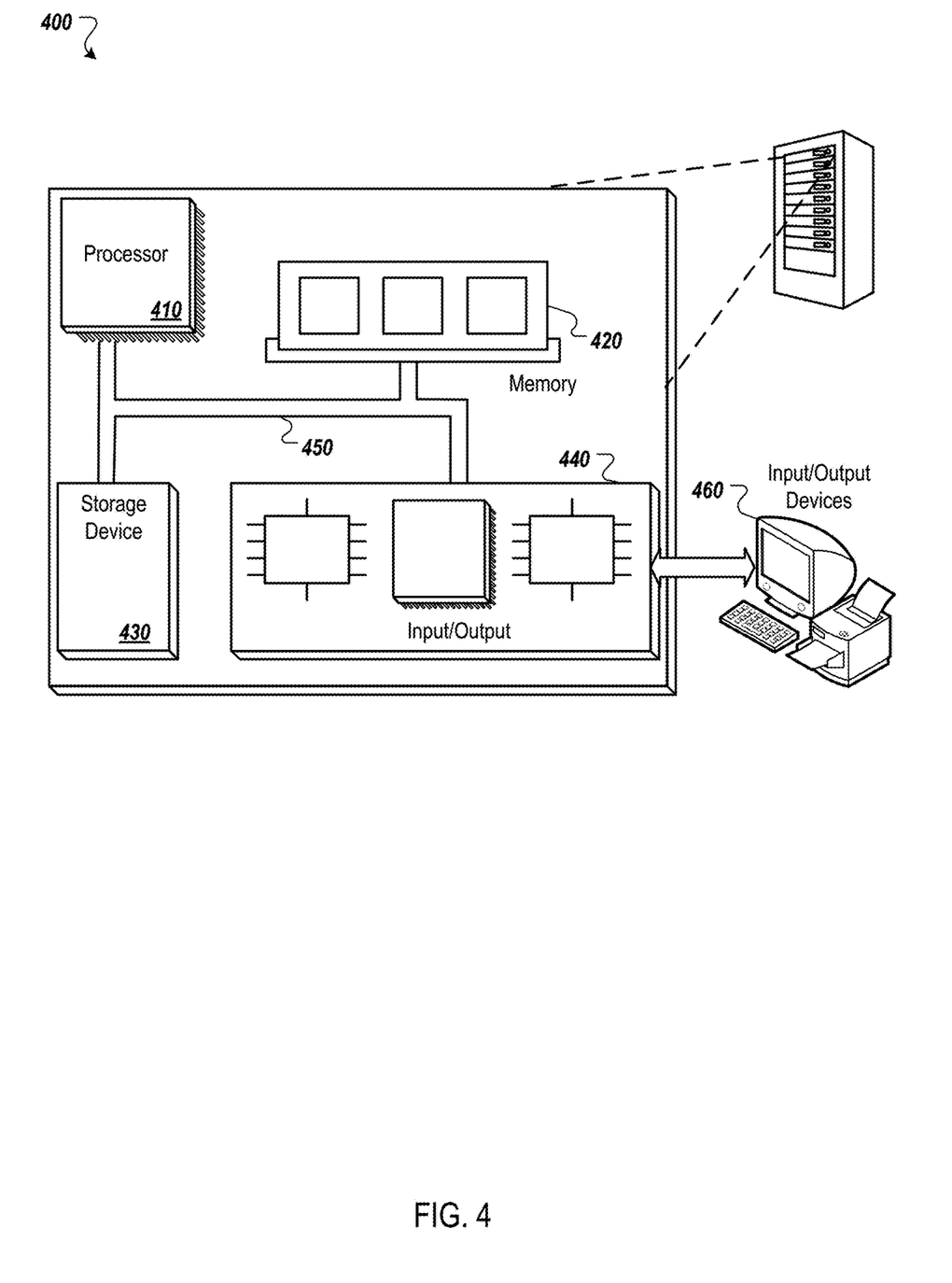
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing units (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460. Other implementations, however, can also be used, such as mobile computing units, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a malware detection system, a request for a certification user interface element for a file to be served in an Internet resource, wherein the file is a file that has previously been classified as not containing malware by the malware detection system, and wherein the certification user interface element certifies that the particular file has been classified by the malware detection system as not containing malware;
   determining, based on the request, that the file is available for download from an Internet resource; and
   storing data that identifies the Internet resource as a location where a malware-free file is available for download;
   obtaining, by the malware detection system, the file for analysis;
   determining that the file does not contain malware; and
   in response to determining that the file does not contain malware:
   classifying the file as a malware-free file that does not contain malware; and
   generating and providing, by the malware detection system and based on the stored entry in a known resources database corresponding to the file, a code snippet that, when included in an Internet resource, causes the certification user interface element to be requested from the malware detection system.

2. The method of claim 1, comprising determining, using the stored data, whether other files that are available at the Internet resource or at a same web site as the Internet resource contain malware.

3. The method of claim 1, the determining that the file is available for download from the Internet resource comprising:
   identifying, by the malware detection system, a file that is available for download from the Internet resource;
   hashing, by the malware detection system, the identified file to a first hash; and
   determining, by the malware detection system, that the first hash is the same as a hash of the file.

4. The method of claim 1, wherein the determining that the file does not contain malware comprising:
   accessing, by the malware detection system, a known resources database; and
   determining, based on a stored entry in the known resources database corresponding to the file, that the file does not contain malware.

5. The method of claim 1, the determining that the file does not contain malware comprising:
   determining, by the malware detection system, that the file does not correspond to any stored entries in a known resources database;
   in response to the determining, scanning, by the malware detection system and using one or more antivirus software programs, the particular file; and
   determining, based on the scanning, that the file does not contain malware.

6. The method of claim 5, the classifying the file as a malware-free file that does not contain malware comprising storing, by the malware detection system and in the known resources database, an entry identifying the file and including an indicator that the file does not contain malware.

7. The method of claim 1, comprising:
   storing, in a database, data indicating the location of the Internet resource and including an indicator that the file is a malware-free;
   accessing, by the malware detection system, the database;
   identifying, by the malware detection system and based on stored data in the database, a set of entries in the database corresponding to the location of the Internet resource; and
   determining, by the malware detection system and based on the set of entries in the database, that the location of the Internet resource is a trusted location.

8. A malware detection system comprising:
   one or more computers; and
   one or more storage devices storing instructions that when executed by the one or more computers cause the one or more computers to perform operations comprising:
   receiving, by the malware detection system, a request for a certification user interface element for a file to be served in an Internet resource, wherein the file is a file that has previously been classified as not containing malware by the malware detection system, and wherein the certification user interface element certifies that the particular file has been classified by the malware detection system as not containing malware;
   determining, based on the request, that the file is available for download from an Internet resource;
   storing data that identifies the Internet resource as a location where a malware-free file is available for download;
   obtaining, by the malware detection system, the file for analysis;
   determining that the file does not contain malware; and
   in response to determining that the file does not contain malware:
   classifying the file as a malware-free file that does not contain malware; and
   generating and providing, by the malware detection system and based on the stored entry in a known resources database corresponding to the file, a code snippet that, when included in an Internet resource, causes the certification user interface element to be requested from the malware detection system.

9. The system of claim 8, the operations comprising determining, using the stored data, whether other files that are available at the Internet resource or at a same web site as the Internet resource contain malware.

10. The system of claim 8, the determining that the particular file is available for download from the Internet resource comprising:
- identifying, by the malware detection system, a file that is available for download from the Internet resource;
- hashing, by the malware detection system, the identified file to a first hash; and
- determining, by the malware detection system, that the first hash is the same as a hash of the file.

11. The system of claim 8, the determining that the particular file does not contain malware comprising:
- accessing, by the malware detection system, a known resources database; and
- determining, based on a stored entry in the known resources database corresponding to the file, that the file does not contain malware.

12. The system of claim 8, the determining that the particular file does not contain malware comprising:
- determining, by the malware detection system, that the file does not correspond to any stored entries in a known resources database;
- in response to the determining, scanning, by the malware detection system and using one or more antivirus software programs, the particular file; and
- determining, based on the scanning, that the file does not contain malware.

13. The system of claim 12, the classifying the file as a malware-free file that does not contain malware comprising storing, by the malware detection system and in the known resources database, an entry identifying the file and including an indicator that the file does not contain malware.

14. The system of claim 8, the operations comprising:
- storing, in a database, data indicating the location of the Internet resource and including an indicator that the file is a malware-free;
- accessing, by the malware detection system, the database;
- identifying, by the malware detection system and based on stored data in the database, a set of entries in the database corresponding to the location of the Internet resource; and
- determining, by the malware detection system and based on the set of entries in the database, that the location of the Internet resource is a trusted location.

15. One or more non-transitory computer readable media storing instructions that when executed by one or more computers cause the one or more computers to perform operations comprising:
- receiving, by a malware detection system, a request for a certification user interface element for a file to be served in an Internet resource, wherein the file is a file that has previously been classified as not containing malware by the malware detection system, and wherein the certification user interface element certifies that the particular file has been classified by the malware detection system as not containing malware;
- determining, based on the request, that the file is available for download from an Internet resource; and
- storing data that identifies the Internet resource as a location where a malware-free file is available for download;
- obtaining, by the malware detection system, the file for analysis;
- determining that the file does not contain malware; and
- in response to determining that the file does not contain malware:
- classifying the file as a malware-free file that does not contain malware; and
- generating and providing, by the malware detection system and based on the stored entry in a known resources database corresponding to the file, a code snippet that, when included in an Internet resource, causes the certification user interface element to be requested from the malware detection system.

16. The computer readable media of claim 15, the operations comprising:
- obtaining, by the malware detection system, the file for analysis;
- determining that the file does not contain malware; and
- in response to determining that the file does not contain malware:
- classifying the file as a malware-free file that does not contain malware; and
- providing a code snippet that, when included in an Internet resource, causes the certification user interface element to be requested from the malware detection system.

* * * * *